Patented Mar. 14, 1939

2,150,772

UNITED STATES PATENT OFFICE 2,150,772

DYES

Werner Lange, Dessau-Ziebigk in Anhalt, Germany, assignor to General Aniline Works, Inc., New York, N. Y., a corporation of Delaware No Drawing. Application October 19, 1937, Serial No. 169,803. In Germany November 4, 1936

10 Claims. (Cl. 260—148)

My present invention relates to a process for manufacturing dyes and to the new products obtainable according to this process.

It is an improvement in or a modification of my invention forming the subject of my copending application filed July 25, 1936, now Patent No. 2,124,881, dated July 26, 1938.

This invention is based on the observation that dyes especially suitable for dyeing chrome leather and vegetable tanned leather valuable Havana brown to olive-tinged brown tones, are obtained when diazotizing an amino-azo-arylsulfonic acid, coupling the diazo compound with an ortho-dihydroxybenzene and after-treating the dyes thus obtained with salts of metals, particularly copper or chromium, and/or oxidizing them with air or another oxidizing agent. Advantageous derivatives of 1,2-dihydroxybenzene are 1,2,3- and 1,2,4-trihydroxybenzene.

The following examples illustrate the invention, the parts being by weight:

*Example 1.*—29.9 parts of 4-aminoazobenzene-4'-sulfonic acid are diazotized in known manner and the diazo compound is combined with 11 parts of 1,2-dihydroxybenzene in the presence of sodium acetate whilst cooling. When coupling is finished the reaction is rendered alkaline by addition of sodium carbonate and a current of air is passed through the solution at a raised temperature until its color undergoes no further alteration. During this operation the color of the solution changes from its original brown-violet to a yellow Havana-brown. The dye is isolated in the usual manner. It dyes chrome leather and vegetable tanned leather Havana-brown shades of good fastness to alkali, acid and light.

Instead of air, another mild oxidizing agent may be used, such as hydrogen peroxide, manganese dioxide, potassium permanganate, ammoniacal cuprammonium compounds, bivalent copper salts or the like.

*Example 2.*—The dye prepared as described in Example 1 from 4-amino-azobenzene-4'-sulfonic acid and 1,2-dihydroxybenzene is treated in alkaline solution at a raised temperature with 50 parts of crystallized copper sulfate and the dye is worked up in the usual manner. It dyes chrome leather and vegetable tanned leather fast shades similar to those of the dye made as described in Example 1.

Instead of copper sulfate another suitable heavy metal salt may be used with a like result, for example nickel sulfate, chrome alum, chromium formate, ferric sulfate and the like.

It is obvious that my invention is not limited to the foregoing examples nor to the specific details given therein.

The amino-azobenzene-sulfonic acid used in the examples may be replaced by a sulfonic acid of another amino-azo compound, such as 4-amino-azobenzene-4',3-disulfonic acid, 2',3-dimethyl-4-amino-azobenzene-sulfonic acid, benzene-4-sulfonic acid azo-4-aminonaphthalene-6(7)-sulfonic acid, and so on.

Instead of 1,2-dihydroxybenzene there may be used a derivative of 1,2-dihydroxybenzene, for instance 1,2,3-trihydroxybenzene, 1,2,4-trihydroxybenzene and so on, without causing an appreciable alteration in the shade and properties of the dyes.

What I claim is:

1. The process which comprises diazotizing an amino compound of the group consisting of amino azo benzene sulfonic acids and benzene azo amino naphthalene sulfonic acids, coupling the diazo compound in the absence of free inorganic acid with a hydroxybenzene compound of the general formula

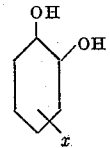

wherein $x$ is a member of the group consisting of H and OH, and subjecting the dye thus obtained to an oxidation process with an oxidizing agent of the group consisting of air, hydrogen peroxide, manganese dioxide, potassium permanganate, bivalent copper salts and cuprammonium salts.

2. The process which comprises diazotizing an amino compound of the group consisting of amino azo benzene sulfonic acids and benzene azo amino naphthalene sulfonic acids, coupling the diazo compound in the absence of free inorganic acid with a hydroxybenzene compound of the general formula

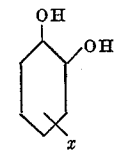

wherein $x$ is a member of the group consisting of H and OH, subjecting the dye thus obtained to an oxidation process with an oxidizing agent of the group consisting of air, hydrogen peroxide, manganese dioxide, potassium permanganate, bivalent copper salts and cuprammonium salts, and transforming it into a metal complex compound.

3. The process which comprises diazotizing 4-aminoazobenzene-4'-sulfonic acid, coupling the diazo compound in the absence of free inorganic acid with a hydroxybenzene compound of the general formula

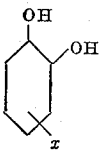

wherein $x$ is a member of the group consisting of H and OH, and subjecting the dye thus obtained to an oxidation process with an oxidizing agent of the group consisting of air, hydrogen peroxide, manganese dioxide, potassium permanganate, bivalent copper salts and cuprammonium salts.

4. The process which comprises diazotizing 4-aminoazobenzene-4'-sulfonic acid, coupling the diazo compound in the absence of free inorganic acid with a hydroxybenzene compound of the general formula

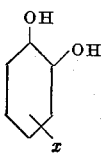

wherein $x$ is a member of the group consisting of H and OH, subjecting the dye thus obtained to an oxidation process with an oxidizing agent of the group consisting of air, hydrogen peroxide, manganese dioxide, potassium permanganate, bivalent copper salts and cuprammonium salts, and transforming it into a metal complex compound.

5. The process which comprises diazotizing 4-aminoazobenzene-4'-sulfonic acid, coupling the diazo compound in the absence of free inorganic acid with 1,2-dihydroxybenzene, and subjecting the dye thus obtained to an oxidation process with an oxidizing agent of the group consisting of air, hydrogen peroxide, manganese dioxide, potassium permanganate, bivalent copper salts and cuprammonium salts.

6. The process which comprises diazotizing 4-aminoazobenzene-4'-sulfonic acid, coupling the diazo compound in the absence of free inorganic acid with 1,2-dihydroxybenzene, subjecting the dye thus obtained to an oxidation process with an oxidizing agent of the group consisting of air, hydrogen peroxide, manganese dioxide, potassium permanganate, bivalent copper salts and cuprammonium salts, and transforming it into a metal complex compound.

7. The dyes as obtainable according to claim 1.
8. The dyes as obtainable according to claim 2.
9. The dyes as obtainable according to claim 5.
10. The dyes as obtainable according to claim 6.

WERNER LANGE.